United States Patent
Ropp et al.

(10) Patent No.: US 7,044,559 B2
(45) Date of Patent: May 16, 2006

(54) VEHICLE SEAT SUSPENSION FORCE ISOLATION APPARATUS

(75) Inventors: Dale Ropp, Buda, IL (US); Cole T. Brodersen, Davenporat, IA (US)

(73) Assignee: Sears Manufacturing Co., Davenport, IA (US)

( * ) Notice: Subject to any disclaimer, the term of this patent is extended or adjusted under 35 U.S.C. 154(b) by 178 days.

(21) Appl. No.: 10/689,563

(22) Filed: Oct. 20, 2003

(65) Prior Publication Data

US 2005/0082897 A1    Apr. 21, 2005

(51) Int. Cl.
    B60N 2/44    (2006.01)
(52) U.S. Cl. ................................... 297/463.1
(58) Field of Classification Search ............. 297/216.1,
    297/216.18, 334.1, 213, 208, 463.1, 344.1;
    267/195, 33, 248, 288, 257, 166.1, 131; 248/562,
    248/565, 429
    See application file for complete search history.

(56) References Cited

U.S. PATENT DOCUMENTS

| | | | |
|---|---|---|---|
| 157,821 A | | 12/1874 | Hansell |
| 199,945 A | | 2/1878 | Vose |
| 596,079 A | * | 12/1897 | Morse .................. 297/208 |
| 623,774 A | * | 4/1899 | Fenton .................. 297/208 |
| 2,056,957 A | * | 10/1936 | Colbridge .............. 248/188.9 |
| 2,152,553 A | * | 3/1939 | Lobdell ................. 297/213 |
| 2,230,416 A | * | 2/1941 | Waldron ................ 297/213 |
| 2,346,895 A | * | 4/1944 | Bergman ............... 297/216.18 |
| 2,801,112 A | | 7/1957 | Piper |
| 2,801,113 A | | 7/1957 | Piper |
| 2,953,191 A | * | 9/1960 | Friedrich .............. 248/565 |
| 2,980,417 A | | 4/1961 | Pence |
| 3,297,312 A | | 1/1967 | Hines |
| 4,913,492 A | | 4/1990 | Shovar |
| 5,425,531 A | | 6/1995 | Perrault |
| 5,507,476 A | | 4/1996 | Lin |
| 5,580,027 A | | 12/1996 | Brodersen |
| 6,267,344 B1 | | 7/2001 | Tateyama et al. |
| 6,336,627 B1 | | 1/2002 | Fujita et al. |
| 6,435,592 B1 | | 8/2002 | Nilsson |
| 2002/0093230 A1 | * | 7/2002 | Bigolin ................. 297/208 |

* cited by examiner

Primary Examiner—Milton Nelson, Jr.
(74) Attorney, Agent, or Firm—Niro, Scavone, Haller & Niro

(57) ABSTRACT

A force isolating apparatus for use in a vehicle seat suspension, where the suspension has a base frame and an upper frame mounted to move horizontally relative to the base frame. The force isolating apparatus comprises: a first pair of in line springs comprising a first coiled wire compression spring and a first elastomeric compression spring; a second pair of in line springs comprising a second coiled wire compression spring and a second elastomeric compression spring; and an actuator disposed between said first and second pairs of springs, the actuator being horizontally movable to actuate one of the spring pairs when the base frame and upper frame move relative to one another.

A force isolating apparatus may be used with a cooperating shock absorber which is also preferably mounted in line to the spring pairs.

9 Claims, 2 Drawing Sheets

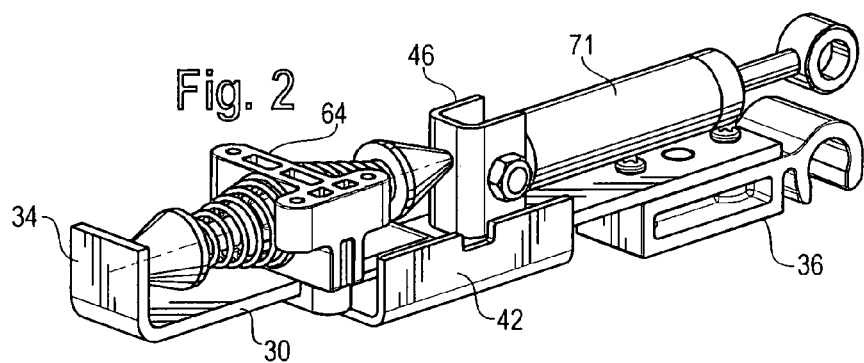
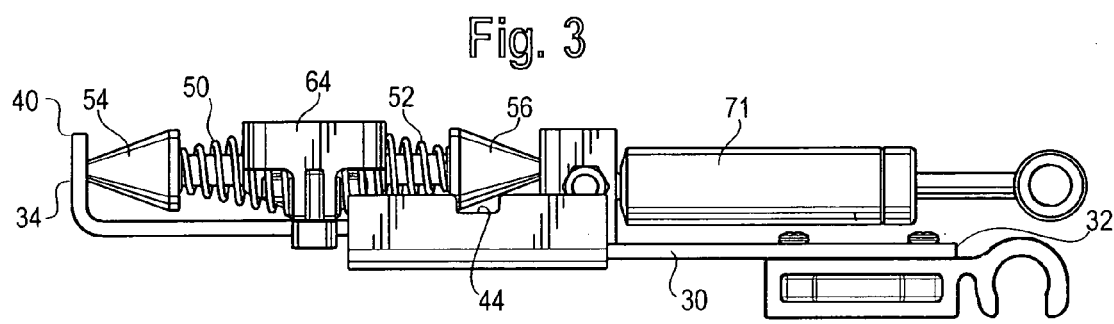
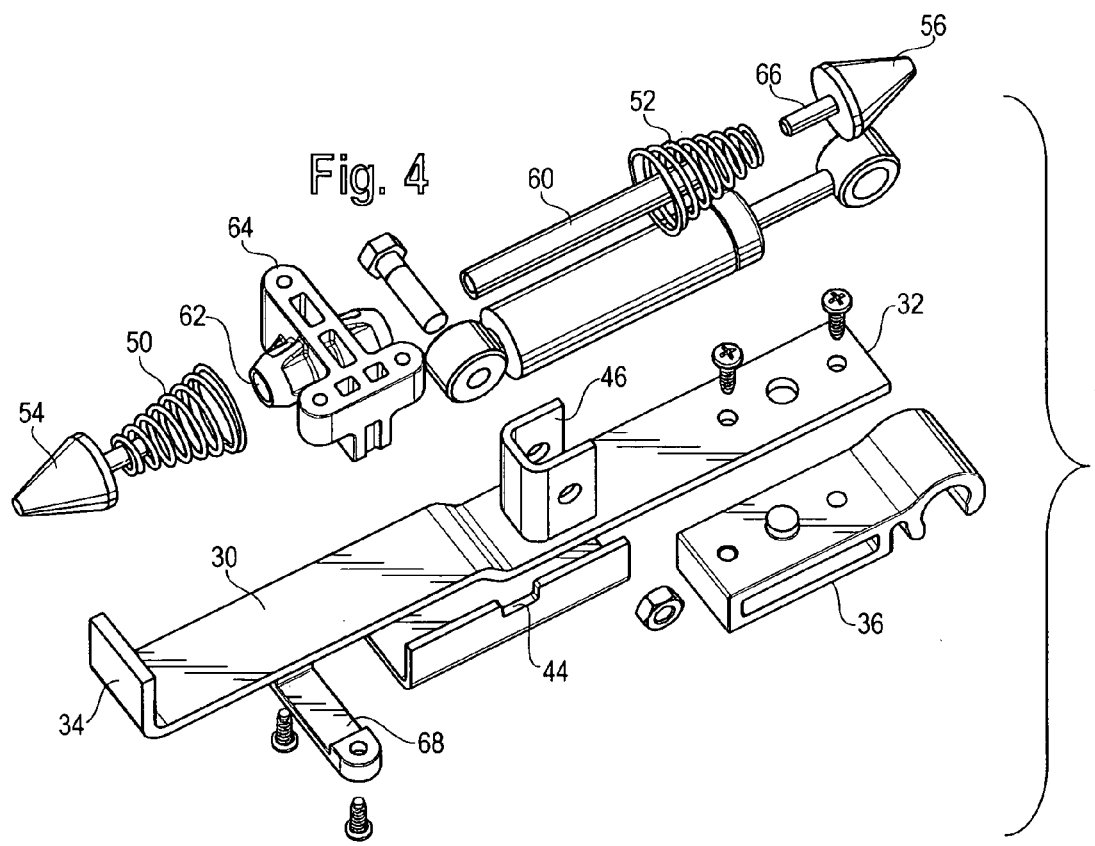

VEHICLE SEAT SUSPENSION FORCE ISOLATION APPARATUS

BACKGROUND OF THE INVENTION

The present invention relates generally to force isolation systems used in vehicle seating. More particularly, the invention relates to improved isolation systems which are smaller and more compact, relatively simple in design and construction, and effective in providing enhanced ride characteristics.

It is well known in the vehicle seating arts that the satisfactory performance of a particular seat and suspension assembly requires that both vertically and horizontally directed forces imparted to the assembly should be reduced or minimized. The seat occupant will be more comfortable and less fatigued if these forces are absorbed and/or dissipated by the seat assembly. As a result, a great variety of vertical fore-aft and lateral isolation systems have been developed. Despite the number and variety of these prior art systems, a need nonetheless still exists for a small, compact and effective isolator system. The present invention is directed to this need.

SUMMARY OF THE INVENTION

The present invention is directed to a force isolating apparatus for use in a vehicle seat suspension, where the suspension has a base frame and an upper frame mounted to move horizontally relative to the base frame. The force isolating apparatus comprises: a first pair of in line springs comprising a first coiled wire compression spring and a first elastomeric compression spring; a second pair of in line springs comprising a second coiled wire compression spring and a second elastomeric compression spring; and an actuator disposed between said first and second pairs of springs, said actuator being horizontally movable to actuate one of the spring pairs when the base frame and upper frame move relative to one another.

The invention is directed further to the above-described force isolating apparatus used with a cooperating shock absorber which is also preferably mounted in line to the spring pairs.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 2 is perspective view showing further construction details of the fore-aft isolator illustrated in FIG. 1;

FIG. 3 is a side elevation view of the isolator illustrated in FIG. 2; and

FIG. 4 is an exploded, perspective view showing each of the components making up the isolator illustrated in FIG. 2.

DETAILED DESCRIPTION OF THE PREFERRED EMBODIMENTS

Figure 1:
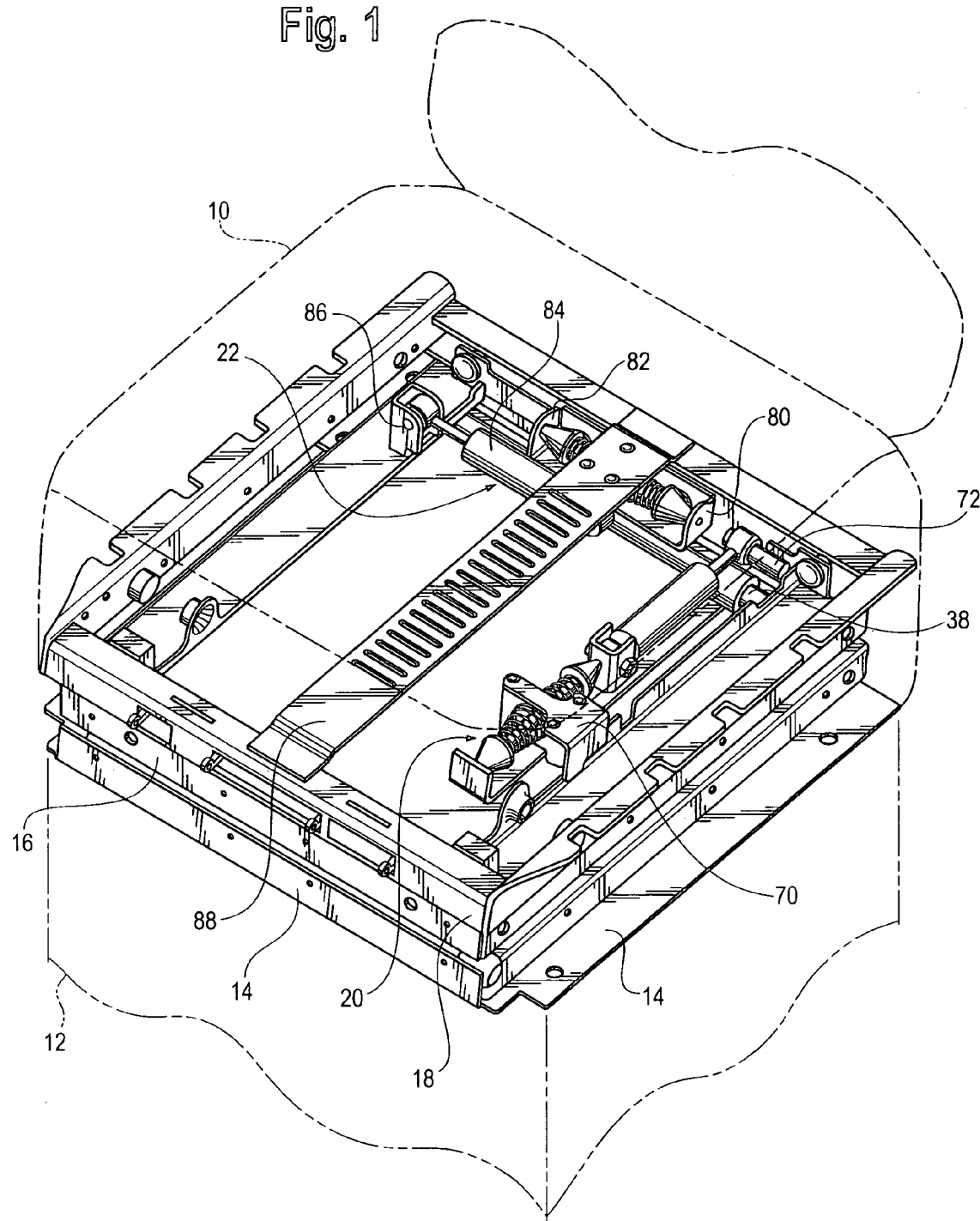
FIG. 1 is a perspective view showing preferred isolation system embodiments constructed in accord with the present invention and located in a conventional seat suspension assembly.

With reference to FIG. 1, portions of a conventional vehicle seat suspension are illustrated. The vehicle seat, itself, is shown in phantom lines and designated generally as 10. The seat and its suspension are typically mounted to the floor of the vehicle cab, which is schematically illustrated in phantom lines and designated generally as 12. The suspension includes a lower frame or housing 14 and an upper frame or housing 16 which is vertically movable relative to the base frame 14. The lower and upper frames are connected via any one of a variety of linkages or mechanisms well known in the art to permit vertical movement of the upper frame. The upper frame 16 is also constructed to permit fore and aft movement relative to the lower frame 14, again in a manner well known in the art. Typically, the upper frame 14 will have rails which cooperate with rollers on the suspension linkage to facilitate this fore and aft movement. The seat suspension also includes an uppermost seat frame or housing 18 which supports the vehicle seat and is constructed in a manner to permit its side to side or lateral movement relative to frames 14 and 16. Once again, there are many different arrangements well known in the art for the mounting and lateral movement of frame 18.

In accordance with the present invention, an isolation assembly 20 is mounted between the base or lower frame 14 and upper frame 16 to absorb and dissipate fore and aft forces transmitted to the seat suspension from the vehicle. This is the fore-aft isolator. In addition, another isolation assembly 22 is mounted between the upper frame 16 and uppermost frame 18; this is the lateral isolator and it absorbs and dissipates side to side forces transmitted to the seat suspension from the vehicle.

As more fully illustrated in FIGS. 2–4, the fore-aft isolator 20 includes a base or platform 30, having a proximal end 32 and distal end 34. At its proximal end 32, the base 30 is provided with a journal block 36 configured to rotatably connect the isolator to, in this case, the suspension linkage upper rear roller shaft 38 (see FIG. 1). The distal end 34 of base 30 is provided with an upwardly extending flange 40 which acts as a spring stop. Intermediate its ends, the base 30 includes a lock out flange 42, with a notch or recess 44, and an upwardly extending bracket 46 which also acts as a spring stop. The base or platform 30 and each of its associated components is disposed in fixed fore-aft position via journal block 36 with the suspension linkage and, in turn, the lower base 14.

The fore-aft isolation assembly 20 also includes an "in line" spring system having two coiled wire compression springs, 50 and 52, and two conical elastomeric compression springs, 54 and 56. The coiled wire springs 50 and 52 are assembled over a spring mounting bar 60 which, in turn, is held in sliding engagement within bore 62 of the spring actuation block 64. The conical elastomeric springs 54 and 56 are provided with mounting pins 66 which are threaded and adapted to connect with internally threaded bores at each end of mounting bar 60. The term "in line," as used in the context of this invention to describe the spring system of the isolation assembly, is intended to mean that a cooperating pair of coiled wire and elastomeric compression springs act along coincident or parallel axes. Most preferably both pairs of coiled wire and elastomeric compression springs act along a common longitudinal axis.

The actuation block 64 is mounted on base 30 in any convenient manner, such as by bracket 68, so that it can move longitudinally back and forth along base 30. The activation block is also mounted in fixed position relative to the upper frame 16 via bracket 70 (see FIG. 1).

The isolator assembly 20 also includes a shock absorber 71 having one end connected to bracket 46 and the other end connected to the upper frame 16, such as at mounting shaft 72 (see FIG. 1).

In operation, when a forward or rearward directed force is transmitted to the lower frame 14 and suspension mechanism, the in line spring system and shock absorber of the fore-aft isolator 20 will absorb and dissipate at least some, if not a substantial portion, of that force. In this way, the occupant of the seat does not experience the full affect of the initially transmitted forces.

As just described and illustrated, the isolator assembly 20 not only includes an in line spring system, but it may also include a shock absorber that is positioned in line. That is, in the preferred embodiment, all of the force absorbing and dissipating components are disposed along a common longitudinal axis. This arrangement facilitates a reduction in the size and envelope of the assembly, making it particularly compact and inexpensive to manufacture and assemble into the seat suspension.

In the event it is necessary or desirable to disable the isolator 20, a lock out lever (not shown) located on the upper housing 16 is positioned to engage notch 44. In this position the spring system and shock absorber are no longer functional.

In order to achieve the benefits of the in line spring system, the spring rates for the coiled wire and elastomeric compression springs should be chosen so that the cooperating pair of springs works together. That is, the coiled wire spring will initially compress with relatively small load inputs before any substantial compression occurs in the elastomeric spring, yet the elastomeric spring will exhibit substantial compression with larger load inputs before the coiled wire spring is completely compressed. Moreover, the cooperative effect of both the coiled wire spring and the elastomeric spring is present in reacting to either forward or rearward directed forces, when the spring actuator moves in either direction. Preferably, the cooperating coiled wire and elastomeric compression springs are selected so that the transition from the coiled wire spring compression to the elastomeric spring compression is smooth; that is the deflection/load performance for the pair of springs will form a smooth curve.

The arrangement of opposing coiled wire and elastomeric compression springs, as just described, provides progressive spring rate springs which act in series when forces are input to the seat in either the fore or aft direction.

A coiled wire compression spring having the following specifications has been found suitable:
1. material: 1.83 mm (0.072 in)dia music wire;
2. number of coils: 9 with ends closed and ground, total of 7 active coils;
3. large mean diameter: 27.8 mm, small mean diameter: 11.4 mm;
4. spring rate: 12 lbs/in (0.210 kg/mm);
5. solid height: 16.46 mm (0.648 in).

A cooperating elastomeric spring having the following specifications has also been suitable:
1. natural rubber with a 50 (shore A) durometer;
2. height: 28.0 mm;
3. large diameter: 25 mm, small diameter: 5.5 mm.

The isolator 22 shown in FIG. 1 is in most respects identical to isolator 20. In this illustrated embodiment, the spring system including two pairs of cooperating compression springs disposed between opposing brackets 80 and 82 which are mounted to upper frame 16. Also, one end of shock absorber 84 is mounted to shaft 86 also affixed to upper frame 16. The spring actuator block is connected to uppermost seat frame 18 via the fore-aft adjustment bracket 88. So too, the shock absorber 84 has its other end connected to the uppermost frame 18 via the actuator block and fore-aft adjustment bracket 88. In this embodiment, the two cooperating pairs of springs are all acting on a common axis, while the shock absorber 84 acts along an axis parallel to that of the spring axis. This isolator will absorb and dissipate lateral forces transmitted to the suspension from the vehicle, thereby enhancing the comfort of the seat occupant.

It will be appreciated by those skilled in the art that various changes and modifications can be made to the illustrated embodiments without departing from the spirit of the present invention. All such modifications and changes are intended to be covered by the appended claims;

Each of these conical springs will therefore exhibit a progressive spring rate; that is, the force required to deflect the spring will increase as the deflection increases.

We claim:

1. A force isolating apparatus for use in a vehicle seat suspension, said suspension having a base frame and an upper frame mounted to move horizontally relative to the base frame, said force isolating apparatus comprising:
   a first pair of in line springs comprising a first coiled wire compression spring and a first elastomeric compression spring;
   a second pair of in line springs comprising a second coiled wire compression spring and a second elastomeric compression spring; and
   an actuator disposed between said first and second pairs of springs, said actuator being horizontally movable to actuate one of the spring pairs when the base frame and upper frame move relative to one another.

2. The force isolating apparatus of claim 1 wherein the first pair of springs is positioned in line with the second pair of springs.

3. The force isolating apparatus of claim 1 further comprising a shock absorber which acts in cooperation with said spring pairs when the base frame and upper frame move relative to one another.

4. The force isolating apparatus of claim 3 wherein said shock absorber is mounted along a longitudinal axis which is coincident with the longitudinal axis of at least one of said spring pairs.

5. The force isolating apparatus of claim 1 wherein said first and second coiled wire compression springs are conical coil springs, having a progressive spring rate.

6. The force isolating apparatus of claim 5 wherein said first and second elastomeric compression springs are conical elastomeric springs, having a progressive spring rate.

7. The force isolating apparatus of claim 1 further comprising a platform having opposing spring stops with the first and second spring pairs mounted between the stops, and wherein said spring actuator is slidably mounted to said platform intermediate the spring stops and between the first and second spring pairs.

8. The force isolating apparatus of claim 7 further comprising a shock absorber which acts in cooperation with said spring pairs.

9. The force isolating apparatus of claim 7 wherein said actuator includes a bore and wherein each spring pair is mounted to a support bar that is slidable supported by the bore in said actuator.

* * * * *